United States Patent [19]

Perelmuter

[11] 4,271,329

[45] Jun. 2, 1981

[54] FUSIBLE TEXTILE DEVICE ADAPTED TO BE PLACED BETWEEN A THERMO-RETRACTIBLE ELEMENT AND ELECTRICAL CONDUCTORS OR COMPONENTS TO PROVIDE A FLUID TIGHT COUPLING

[75] Inventor: Michel Perelmuter, Paris, France

[73] Assignee: Compagnie Francaise des Isolants, France

[21] Appl. No.: 813,366

[22] Filed: Jul. 6, 1977

[30] Foreign Application Priority Data

Jul. 6, 1976 [FR] France .................................. 76 20557

[51] Int. Cl.³ .......................... H01R 4/70; H01R 4/20
[52] U.S. Cl. ...................................... 174/84 R; 87/1; 87/9; 156/85; 156/86; 174/DIG. 8; 285/381; 428/36; 428/245
[58] Field of Search ................ 87/1, 8, 9, 11; 57/142, 57/159, 22, 202; 174/35 C, 75 R, 84 R, 85, 88 C, 90–97, DIG. 8; 156/81, 84–86; 285/235, 381, 291–293; 428/35, 36, 225, 228, 245; 403/223, 273

[56] References Cited

U.S. PATENT DOCUMENTS

| | | | |
|---|---|---|---|
| 2,262,861 | 11/1941 | Rugeley et al. ...................... | 87/9 X |
| 2,335,088 | 11/1943 | Shoemaker ............................ | 87/9 X |
| 2,393,530 | 1/1946 | Harris .................................... | 87/9 |
| 2,936,257 | 5/1960 | Nailler et al. ......................... | 87/9 X |
| 3,105,492 | 10/1963 | Jeckel .................................... | 87/9 X |
| 3,770,556 | 11/1973 | Evans et al. ...................... | 285/381 X |
| 3,818,123 | 6/1974 | Maltz et al. ........................ | 174/88 C |
| 3,936,336 | 2/1976 | Phillips ................................. | 87/9 X |
| 3,975,039 | 8/1976 | Penneck et al. ................... | 156/86 X |
| 4,035,534 | 7/1977 | Nyberg ................................. | 428/36 |
| 4,048,277 | 9/1977 | Breznak et al. .................... | 57/159 X |
| 4,070,044 | 1/1978 | Carrow ............................. | 285/381 X |
| 4,144,404 | 3/1979 | DeGroef et al. ............... | 174/84 R X |

FOREIGN PATENT DOCUMENTS

500077 2/1939 United Kingdom ......................... 87/9

Primary Examiner—John Petrakes
Attorney, Agent, or Firm—William A. Drucker

[57] ABSTRACT

A braid, consisting of monofilaments, made of two different resins which are adapted, when heated, to fuse and mix and be subjected to polymerization or crosslinking. The braid is interposed between a thermo-retractible sleeve and conductors which are to be covered by the sleeve.

13 Claims, 4 Drawing Figures

FUSIBLE TEXTILE DEVICE ADAPTED TO BE PLACED BETWEEN A THERMO-RETRACTIBLE ELEMENT AND ELECTRICAL CONDUCTORS OR COMPONENTS TO PROVIDE A FLUID TIGHT COUPLING

The invention relates to the fluidtightness of coupling and protection devices comprising a thermo-retractible element.

It is known that these devices are used, in the forms of sheaths or tapes, especially for insulatingconductive cables, for covering spliced joints, for insulating cable lugs or for providing protection for components.

The fluidtightness of a thermally retractible sleeve or moulded article is usually obtained either by the enduction of the internal surface of the thermo-retractible article by means of a fusible material, or by placing in position of a fusible tube, at the interior of the thermo-retractible element. These known methods do not permit the obtaining of a uniform distribution of the fusible sealing material on the internal surface of the thermo-retractible element when the latter does not have a regular shape, and perfect fluidtightness is not certain.

The invention has for its object a fusible textile device which can be stored without losing its qualities, is adapted to be placed readily in position between a thermo-retractible element and the members which it covers, fitting perfectly, by reason of its flexibility, the irregularities of shape of the thermo-retractible material and undergoing, during the heating intended to bring about shrinkage of the thermo-retractible element, a transformation in situ which confers on it the necessary properties to assure fluidtightness.

According to the invention this device is braided, knitted or woven and constituted of threads formed of at least two different fusible synthetic materials, chosen in such a manner that, during the heating of the thermo-retractible element, the fusion of these two materials is accompanied by the formation, by polymerisation or corss-linking, of a new material suitable for assuring a fluidtight coupling between the thermo-retractible element and the members which it covers.

According to a preferred manner of procedure, the threads are monofilaments obtained by extrusion.

The various advantages, as well as the features of the invention, will appear clearly from the following description of two examples of procedure.

In the accompanying drawing:

FIG. 1 shows a device in the form of braid, of which

Figure 1:
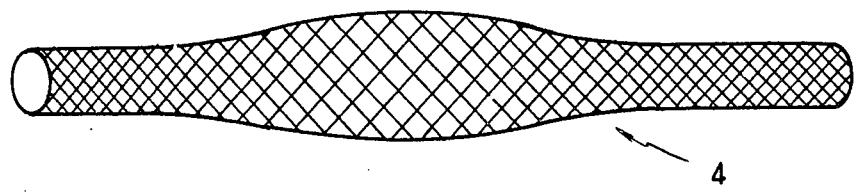

As is shown by FIG. 1, a device having the form of a tubular braid is particularly flexible and if there is an irregularity in the shape of the object the shape of which it conforms, it readily deforms in order to ensure a homogeneous covering.

It must always be well understood that the device described could, in a variation, be knitted or woven, and produced in the form of a strip of cloth, or a tape.

Figure 2:
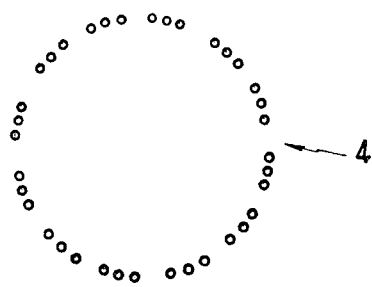
FIG. 2 shows a transverse section, on a larger scale.

FIG. 2 shows that the braided tube of FIG. 1 comprises, by way of example, 12 groups each composed of three monofilaments, 18 of which monofilaments are epoxy and the remainder polyamide in a specific example hereinafter described, although other ratios and materials can be selected to suit end use requirements.

Figure 3:
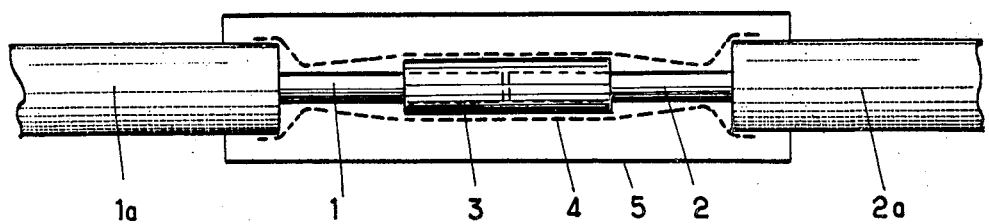
FIG. 3 shows a junction between two conductors, covered by a braided tube conforming to FIGS. 1 and 2, itself covered by a thermo-retractible sleeve, the whole not yet having undergone any heating.

In FIG. 3 there have been shown at 1 and 2 two conductors covered by a metallic junction 3. There is placed about the junction 3, of the conductors and the extremities of their insulating sheaths 1a and 2a, a tubular braid 4 itself surrounded by a sleeve 5 of thermo-retractible material.

Figure 4:
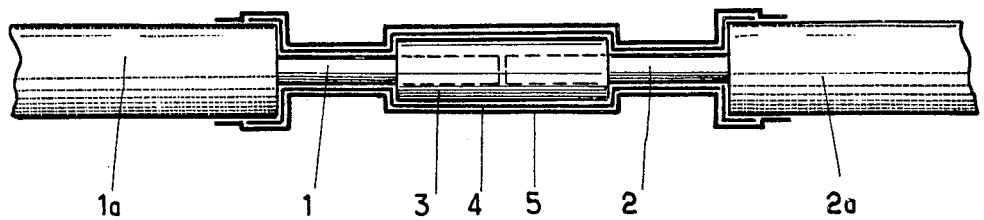
FIG. 4 shows the same assembly, after heating.

During the heating of the thermo-retractible sleeve which brings about the shrinkage, the braid 4 melts and hardens, the assembly closely applying itself to the shape of the members to be covered (FIG. 4). The insulation is perfectly reformed and protection of the junction is assured.

There will now be given two examples of production of a fluidtight braid.

EXAMPLE 1

There are manufactured, by extrusion, two different monofilaments, one from an epoxy resin marketed by the SHELL company under the name "Epiote 1001", the other from a polyamide resin marketed by the SCHERING company under the name "Versamid 940". The extrusion takes place on an extrusion chain monofilament; the rate of drawing is less than 4 and the diameter of the monofilaments is 0.25 mm.

There are produced, by assembly of thee monofilaments in a fabric on an automatic copping machine, 32 bobbins starting with each of the two monofilaments. The whole of the 64 bobbins is mounted on a braiding machine having 64 needles, with intercalation of a bobbin on two of each type. The necessary adjustment is made for obtaining a braid having 4 links per cm., which permits the manufacture of a braid of 15 mm. nominal diameter adapted to be used in cooperation with the thermo-retractible sleeve marketed by the Applicant under the name "Electène A 200".

It should be well understood that the numerical values given above are not limiting. The percentage of epoxy monofilament, equal to 50% in this example, could in particular vary between 25 and 75%.

During the rise of temperature of the braid which is produced when the thermo-retractible sleeve is heated, there is fusion of the polyamide resin which then plays the part of a catalyst for cross-linking of the epoxy resin. As a result of this process, the mixture spreads in situ on the surfaces to be covered (formed by the links of the braid) and hardens to assure finally an effective enclosing.

EXAMPLE 2

The process differs from example 1 by the following points:

one of the two monofilaments is manufactured from a polyester resin marketed by the AKZO company under the name "Armite A 200"; the other is manufactured from a resin of the ethylene-vinyl-acetate type marketed by the DUPONT DE NEMOURS company under the name "Elvaux 265", with which there is mixed a polyurethane resin marketed by the BAYER company under the name "desmodur AP stable", in the proportion by weight of ⅓ "Desmodur AP stable" resin to ⅔ "Elvaux 265" resin.

22 bobbins are made with each of the two monofilaments and the whole of the 44 bobbins is mounted on a braiding machine with 44 needles. The nominal diameter of the braid obtained is 10 mm. It can be used in conjuction with the sleeve marketed by the Applicant under the name "Electène A 150".

The heating causes fusion of the polyester resin, which mixes with the polyurethane resin, to form a cross-linked polyurethane.

The two examples above are not limiting. One of the two monofilaments necessarily comprises a resin adapted to undergo polymerisation or cross-linking, but it can be selected from a wide range of products (polyesters, polyamides, polyolefins, epoxys, polyurethanes, or other thermo-plastic materials, or a combination of these materials). The other monofilament is constituted by a fusible resin which serves as a catalyst (or a support for the catalyst) permitting the cross-linking or polymerisation of the whole. The nature of this resin could also be varied and it will be understood by persons skilled in the relevant technology that the polymerising interaction of the one monofilament with the coreactant provided by the other monofilament is the essence of the invention, regardless of whether or not a true "catalyst" or catalytic effect is present.

The monofilaments are produced by extrusion, which makes them preferable, for reasons of industrial manufacture, to multi-strand filaments which could nevertheless be used without exceeding the scope of the invention.

I claim:

1. A device, for interposing between electrically conductive means and a thermo-retractible protective element disposed about said electrically conductive means, to effect electrically-insulating fluid-tight connection between said thermo-retractible protective element and said electrically conductive means, said device comprising a portion of a fabric having first and second interengaged threads, said first and second threads each being constituted of a respective fusible synthetic resinous material which is different from that of the other of said threads, the synthetic resinous material of which said first thread is constituted being selected to undergo polymerisation or cross-linking upon the application of heating by interaction with the material of which said second thread is constituted.

2. A device, as claimed in claim 1, wherein the synthetic resinous material of said second thread constitutes a catalyst for the said polymerisation or cross-linking.

3. A device, as claimed in claim 1 wherein the synthetic resinous material of which said second thread is constituted includes a catalyst for the polymerisation or cross-linking.

4. A device, as claimed in claim 1, wherein said first and second threads are braided.

5. A device, as claimed in claim 1, wherein said first and second threads are knitted.

6. A device, as claimed in claim 1, wherein said first and second threads are woven.

7. A device, as claimed in claim 1, in the form of a sleeve.

8. A device, as claimed in claim 1, wherein said first and second threads are monofilaments.

9. A device, as claimed in claim 1, wherein said first thread is of epoxy resin and said second thread is of polyamide resin.

10. A device, as claimed in claim 1, wherein said first thread is of polyester resin and said second thread is of a mixture of ethylene vinyl acetate resin and polyurethane resin.

11. In combination, for the production of an electrically-insulating fluid-tight protective covering about an electrically-conducting means:

(i) a protective sheath for placing about said electrically-conducting means, said sheath being made of a material selected, upon the application of heating at a predetermined temperature, to be thermo-retractible, and (ii) a sleeve for interpositioning between said sheath and said electrically-conducting means, said sleeve being of a fabric having first and second interengaged threads, said first and second threads each being constituted of a respective fusible synthetic resinous material which is different from that of the other of said threads, the synthetic resinous material of which said first thread is constituted being selected to undergo polymerisation or cross-linking upon the application of heating at said predetermined temperature and in the presence of a catalyst, the synthetic resinous material of which said second thread is constituted being selected to provide said catalyst.

12. In an assembly comprising a portion of each of two electrically conductive elements and an electrically-conductive joint formed between said portions, the improvement which comprises an electrically-insulating fluid-tight protective covering formed about said assembly, said covering being the resultant of applying heating at a predetermined temperature to a protective sheath and sleeve as set forth in claim 11, said sheath and said sleeve being disposed about said portion and said joint, and said sleeve being interposed between said sheath and said portions and said joint.

13. A device as claimed in claim 1, wherein the synthetic resinous material of which said second thread is constituted polymerises or cross-links with the synthetic resinous material of which said first thread is constituted.

* * * * *